(12) United States Patent
Wang et al.

(10) Patent No.: US 9,452,951 B2
(45) Date of Patent: Sep. 27, 2016

(54) SYSTEM FOR CALCINING ACTIVE LIME WITH A PRECALCINING FURNACE AND METHOD USING THE SAME

(71) Applicants: CITIC Heavy Industries Co., Ltd., Luoyang (CN); Luoyang Mining Machinery Engineering Design And Research Institute Co., Ltd., Luoyang (CN)

(72) Inventors: Jisheng Wang, Henan Province (CN); Kaibo Zhang, Henan Province (CN); Bin Qiao, Henan Province (CN); Wen Zhu, Henan Province (CN); Lin Jiang, Henan Province (CN)

(73) Assignees: CITIC Heavy Industries Co., Ltd., Luoyang, Henan Province (CN); Luoyang Mining Machinery Engineering Design and Research Institute Co., Ltd., Luoyang, Henan Province (CN)

( * ) Notice: Subject to any disclaimer, the term of this patent is extended or adjusted under 35 U.S.C. 154(b) by 533 days.

(21) Appl. No.: 13/780,348

(22) Filed: Feb. 28, 2013

(65) Prior Publication Data

US 2013/0224103 A1 Aug. 29, 2013

(30) Foreign Application Priority Data

Feb. 29, 2012 (CN) .......................... 2012 1 0048908

(51) Int. Cl.
*F27B 15/02* (2006.01)
*C04B 2/02* (2006.01)
*F27B 7/20* (2006.01)
(Continued)

(52) U.S. Cl.
CPC . *C04B 2/02* (2013.01); *C04B 2/10* (2013.01); *F27B 7/2016* (2013.01); *F27D 9/00* (2013.01); *F27D 2009/0002* (2013.01)

(58) Field of Classification Search
CPC ........... C04B 7/43; C04B 7/434; C03B 3/02; C03B 3/023; F27B 7/2016; F27B 7/2033; F27B 7/205; F27B 7/34
USPC ....................... 432/13, 14, 106; 106/739, 744
See application file for complete search history.

(56) References Cited

U.S. PATENT DOCUMENTS 4,243,379 A * 1/1981 Horn ...................... F27B 7/2016
432/106
6,488,765 B1 * 12/2002 Tseng ...................... C04B 7/434
106/739

(Continued)

*Primary Examiner* — Gregory A Wilson
(74) *Attorney, Agent, or Firm* — Ice Miller LLP

(57) ABSTRACT

The invention provides a system for calcining active lime, including a precalcining furnace for receiving limestone materials to be calcined and precalcining the limestone materials, and a rotary kiln for receiving the materials containing precalcined product from the precalcining furnace, outputting the formed active lime, and at the same time supplying a first flue gas to the precalcining furnace. The calcining system further includes a precalcining furnace combustion device, which generates a second flue gas and supplies it to the precalcining furnace, such that the limestone materials are precalcined in the precalcining furnace under the action of the first flue gas and the second flue gas. In this way, the precalcining rate of the limestone materials in the precalcining furnace is significantly improved. Since the heat exchange in the precalcining furnace is mainly in the form of convective heat exchange having a high heat efficiency, the heat exchange efficiency of the whole system is improved, and thus the heat consumption of the system is reduced.

6 Claims, 1 Drawing Sheet

(51) Int. Cl.
*C04B 2/10* (2006.01)
*F27D 9/00* (2006.01)

(56) References Cited

U.S. PATENT DOCUMENTS

| | | | |
|---|---|---|---|
| 6,599,123 B2* | 7/2003 | Ramirez-Tobias | C04B 7/00 106/757 |
| 8,876,970 B2* | 11/2014 | Kupper | C04B 7/367 106/739 |
| 8,894,764 B2* | 11/2014 | Archetti | B01D 53/56 106/761 |
| 9,067,827 B2* | 6/2015 | Stender | C04B 7/364 |
| 2007/0184396 A1* | 8/2007 | Lowes | F27D 7/04 432/58 |
| 2012/0247370 A1* | 10/2012 | Kupper | C04B 7/365 106/638 |

* cited by examiner

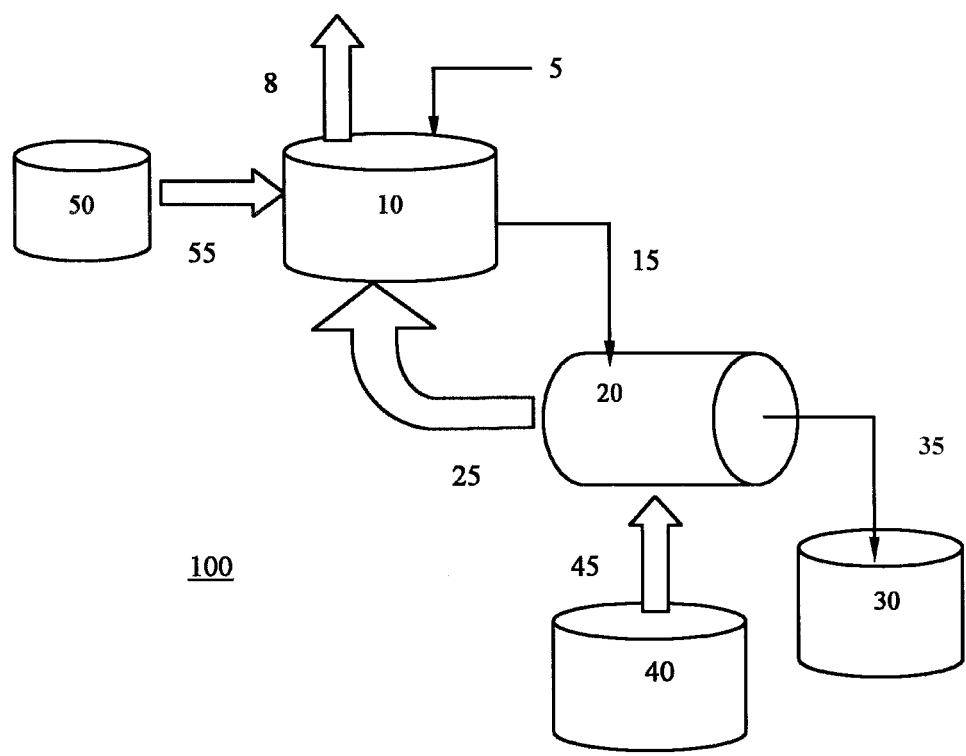

SYSTEM FOR CALCINING ACTIVE LIME WITH A PRECALCINING FURNACE AND METHOD USING THE SAME

TECHNICAL FIELD

The invention relates to a system for calcining active lime, in particular to a system for calcining active lime comprising a rotary kiln. The invention further relates to a method for calcining active lime.

TECHNICAL BACKGROUND

Currently, the calcination of active lime mainly includes two processes, i.e., the process using a gas-burning shaft kiln and the process using a rotary kiln with a pre-heater. In the former process, although the heat consumption in calcining active lime with the gas-burning shaft kiln is low, it is necessary to use limestones having a size larger than 40 mm, which leads to a low utilization rate of minerals. In addition, the activity of active lime calcined through such a process is relatively low.

In the latter process, the active lime calcined by using the rotary kiln with a pre-heater has a relatively high activity and stable quality, and fine grained limestones having a size of 10-40 mm can be used. Thus, the latter process is widely used in this field. In the latter process, however, when the high temperature flue gas generated in the rotary kiln is supplied to the pre-heater and then preheats the limestones therein, the limestones generally have a precalcining rate of 20-25%, such that most of the limestones will be calcined in the rotary kiln. However, the calcination of the limestones in the rotary kiln is mainly in the form of radiant heat exchange, which has a low thermal efficiency, and the rotary kiln shell radiates too much heat on its surface, resulting in an increase of the system's energy consumption. Therefore, the latter process has a relatively high heat consumption, which has become a pressing problem to be solved in the prior art.

SUMMARY OF THE INVENTION

In view of the above technical problems in the prior art, the invention aims to provide a system for calcining active lime including a precalcining furnace and a rotary kiln, which has a reduced heat consumption.

According to a first aspect of the invention, a system for calcining active lime is provided, including a precalcining furnace for receiving limestone materials to be calcined and precalcining the limestone materials, and a rotary kiln for receiving the materials containing precalcined product from the precalcining furnace, outputting the formed active lime, and at the same time supplying a first flue gas to the precalcining furnace, wherein the calcining system further includes a precalcining furnace combustion device, which generates a second flue gas and supplies it to the precalcining furnace, such that the limestone materials are precalcined in the precalcining furnace under the action of the first flue gas and the second flue gas.

According to the invention, an additional high temperature flue gas can be introduced into the precalcining furnace through providing a precalcining combustion device in the system for calcining active lime. In this manner, both the temperature and the amount of the high temperature flue gas can be significantly improved, and the precalcining rate of the limestone materials in the precalcining furnace is greatly improved. In this case, only a relatively small amount of limestones needs to be calcined in the rotary kiln. Since the calcination of the limestones in the rotary kiln is in the form of radiant heat exchange having a low heat efficiency while the heat exchange in the precalcining furnace is mainly in the form of convective heat exchange having a high heat efficiency, the heat exchange efficiency of the whole system is improved, and thus the heat consumption of the system is reduced.

In one embodiment, the temperature of the second flue gas is higher than that of the first flue gas.

In one embodiment, the second flue gas heats the limestone materials alone before being mixed with the first flue gas. Preferably, the second flue gas is supplied to the precalcining furnace in a direction opposite to the flow direction of the limestone materials.

The second flue gas from the precalcining furnace combustion device and having a higher temperature heats and calcines the limestone materials firstly, then is mixed with a first flue gas from the rotary kiln and having a lower temperature, and finally heats and calcines the limestone materials again. Therefore, the precalcining rate of the limestone materials can easily be improved by sufficiently utilizing the second flue gas having a higher temperature.

According to the present invention, the limestone materials have a precalcining rate of 50-60% in the precalcining furnace. Consequently, it is possible to use fine grained limestones as raw materials.

The calcining system may further include a cooler for cooling the active lime from the rotary kiln, and/or a rotary kiln burner for supplying a third flue gas to the rotary kiln.

According to a second aspect of the invention, a method of calcining active lime, including: precalcining the limestone materials in the precalcining furnace; supplying the materials containing precalcined product from the precalcining furnace to the rotary kiln; supplying a first flue gas from the rotary kiln to the precalcining furnace and outputting the formed active lime, wherein a second flue gas is supplied to the precalcining furnace, such that the limestone materials are precalcined in the precalcining furnace under the action of the first flue gas and the second flue gas.

BRIEF DESCRIPTION OF DRAWINGS

The invention will be demonstrated in detail on the basis of the accompanying drawing. It should be noted that the drawing is provided merely for the purpose of better understanding the invention, rather than limiting the invention in any way. In the drawing, FIG. 1 shows the schematic structure of the system for calcining active lime according to the invention.

DETAILED DESCRIPTION OF THE INVENTION

FIG. 1 shows a system 100 for calcining active lime according to the invention, including a precalcining furnace 10 and a rotary kiln 20. Limestone materials 5 are supplied to the precalcining furnace 10, and precalcined therein under the action of high temperature flue gas. The materials 15 containing precalcined limestones are supplied from the precalcining furnace 10 to the rotary kiln 20, such that the remaining undecomposed limestones will be still burned in the rotary kiln 20, from which the formed active lime 35 is finally output. The exhaust 8 is discharged from the precalcining furnace 10.

The system 100 for calcining active lime further includes a cooler, for example, a vertical cooler 30. Thus the high temperature active lime 35 from the rotary kiln 20 is supplied to the vertical cooler 30, and shock-cooled therein to a temperature below 100° C.

In addition, the system 100 for calcining active lime further includes a rotary kiln burner 40, which can generate a high temperature flue gas 45 and then supply it to the rotary kiln 20, such that the limestones can be calcined in the rotary kiln 20. Furthermore, the high temperature tail flue gas 25 generated by the calcination of limestones in the rotary kiln 20 is supplied to the precalcining furnace 10, such that the limestone materials can be precalcined therein. Generally, the limestones have a precalcining rate of 20-25%.

The system 100 for calcining active lime according to the invention further includes a precalcining furnace combustion device 50, which can generate a high temperature flue gas 55 and then supply it to the precalcining furnace 10. Thus the high temperature flue gas flowing into the precalcining furnace 10 can be divided into two streams, i.e., the high temperature flue gas 55 from the precalcining furnace combustion device 50 and the high temperature flue gas 25 from the rotary kiln 20. Therefore, both the temperature and the amount of the high temperature flue gas are significantly improved.

According to the invention, the temperature of the high temperature flue gas 55 generated by the precalcining furnace combustion device 50 is set to be higher than that of the high temperature tail flue gas 25 from the rotary kiln 20. Generally, the temperature of the high temperature flue gas 25 is, for example, in a range of 1000-1050° C. In this case, the temperature of the high temperature flue gas 55 generated by the combustion device 50 can be controlled within the range of 1150-1300° C. In order to sufficiently utilize the high temperature flue gas 55, the high temperature flue gas 55 heats the limestone materials alone prior to the high temperature tail flue gas 25. The high temperature tail flue gas 25 is supplied to a position above the high temperature flue gas 55, and, after being mixed with the high temperature flue gas 55 that has been thermally exchanged partially, heats and calcines the limestone materials together with the high temperature flue gas 55. In this way, the high temperature flue gas 55 having a higher temperature calcines the limestone materials for a longer time, such that a relatively high precalcining rate can be obtained.

The precalcining rate of the limestone materials in the precalcining furnace 10 can be significantly improved under the action of the two streams of high temperature flue gas. Therefore, the proportion of undecomposed limestones in the materials 15 supplied from the precalcining furnace 10 to the rotary kiln 20 is reduced, and thus only a small amount of limestones needs to be calcined in the rotary kiln 20. Because the heat exchange in the precalcining furnace 10 is mainly in the form of convective heat exchange having a high efficiency, and the area on which the flue gas contacts with the limestones is relatively large, the efficiency of heat exchange is high, and thus the heat consumption of the system is reduced.

In one embodiment, the high temperature flue gas 25 and 55 are continuously supplied to the precalcining furnace 10 by means of a blower. Preferably, the high temperature flue gas 55 is supplied to the precalcining furnace 10 in a direction opposite to the flow direction of the limestone materials.

According to the invention, the limestone materials in the precalcining furnace 10 preferably have a precalcining rate of 50-60% under the action of two streams of high temperature flue gas from the precalcining furnace combustion device 50 and from the rotary kiln 20. In this manner, the proportion of limestones that needs to be calcined in the rotary kiln 20 is reduced to 40-50%. Consequently, a system in particular having a desirable heat consumption can be obtained.

Because the rotary kiln is operated in the form of open calcination, the limestones can be completely and evenly calcined. According to the invention, preferably, 40-50% of the limestones is calcined in the rotary kiln 20. Therefore, the calcination quality of the active lime (i.e. having a high activity) can be guaranteed, and at the same time, it is possible to use fine grained limestones as raw materials.

Although the invention has been described with reference to some embodiments, improvements can be made and the components thereof can be replaced by equivalents without departing from the scope of the invention. In particular, as long as there is no structural conflict, various features of embodiments disclosed in the invention can be used in combination with each other in any manner. Those combinations are not exhaustively described in the invention only for the purpose of conciseness. Therefore, the present invention is not limited to the specific embodiments disclosed herein, but includes all the technical solutions falling within the scope of the claims.

The invention claimed is:

1. A system for calcining active lime, comprising
a precalcining furnace for receiving limestone materials to be calcined and adapted to precalcine the limestone materials so as to produce a precalcined material,
a rotary kiln for receiving the precalcined material from the precalcining furnace, the rotary kiln adapted to form active lime and to output the active lime while simultaneously supplying a first flue gas to the precalcining furnace,
the calcining system further including a precalcining furnace combustion device that generates a second flue gas and supplies it to the precalcining furnace, such that the limestone materials are precalcined in the precalcining furnace under the action of the first flue gas and the second flue gas, the temperature of the second flue gas being maintained higher than that of the first flue gas, wherein the second flue gas heats the limestone materials alone before being mixed with the first flue gas, and wherein the calcining system further includes a cooler for cooling the active lime from the rotary kiln.

2. The calcining system according to claim 1, characterized in that the second flue gas is supplied to the precalcining furnace in a direction opposite to the flow direction of the limestone materials.

3. The calcining system according to claim 1, characterized in that the limestone materials have a precalcining rate of 50-60% in the precalcining furnace.

4. The calcining system according to claim 1, characterized in that the calcining system further includes a rotary kiln burner for supplying a third flue gas to the rotary kiln.

5. A system for calcining active lime, comprising:
a precalcining furnace for receiving limestone materials to be calcined and adapted to precalcine the limestone materials so as to produce a precalcined material,
a rotary kiln for receiving the precalcined material from the precalcining furnace, the rotary kiln adapted to form active lime and to output the active lime while simultaneously supplying a first flue gas to the precalcining furnace,
the calcining system further including a precalcining furnace combustion device that generates a second flue gas and supplies it to the precalcining furnace, such that the limestone materials are precalcined in the precalcining furnace under the action of the first flue gas and the second flue gas, the temperature of the second flue gas being maintained higher than that of the first flue gas; wherein the second flue gas heats the limestone materials alone before being mixed with the first flue gas; wherein the second flue gas is supplied to the precalcining furnace in a direction opposite to the flow direction of the limestone materials; and wherein the calcining system further includes at least one of a component selected from the group consisting of (a) a cooler for cooling the active lime from the rotary kiln, and (b) a rotary kiln burner for supplying a third flue gas to the rotary kiln.

6. The calcining system according to claim 5, characterized in that the limestone materials have a precalcining rate of 50-60% in the precalcining furnace.

* * * * *